US011638218B2

(12) United States Patent
He et al.

(10) Patent No.: US 11,638,218 B2
(45) Date of Patent: Apr. 25, 2023

(54) SYSTEM AND METHOD FOR CONTROLLING BEAM TYPE IN SIGNAL TRANSMISSION

(71) Applicant: QUALCOMM Incorporated, San Diego, CA (US)

(72) Inventors: Ruhua He, San Diego, CA (US); Shrenik Patel, San Diego, CA (US); Sang-June Park, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/893,004

(22) Filed: Jun. 4, 2020

(65) Prior Publication Data
US 2020/0389850 A1    Dec. 10, 2020

Related U.S. Application Data

(60) Provisional application No. 62/859,620, filed on Jun. 10, 2019.

(51) Int. Cl.
*H04W 52/14* (2009.01)
*H04W 52/42* (2009.01)
(Continued)

(52) U.S. Cl.
CPC ........ *H04W 52/146* (2013.01); *H04B 17/318* (2015.01); *H04L 1/0004* (2013.01);
(Continued)

(58) Field of Classification Search
CPC . H04W 52/146; H04W 52/42; H04W 52/241; H04W 72/046; H04W 72/0473;
(Continued)

(56) References Cited

U.S. PATENT DOCUMENTS 10,812,125 B1 * 10/2020 Badic .................. H04B 7/0874
2011/0110257 A1    5/2011 Kim et al.
(Continued)

FOREIGN PATENT DOCUMENTS

| EP | 1895677 A2 | 3/2008 |
|---|---|---|
| WO | 2018137424 A1 | 8/2018 |

OTHER PUBLICATIONS

International Search Report and Written Opinion dated Sep. 15, 2020 from corresponding PCT Application No. PCT/US2020/036395.

*Primary Examiner* — Abdullahi Ahmed
(74) *Attorney, Agent, or Firm* — Arent Fox, LLP

(57) ABSTRACT

In an aspect of the disclosure, a method, a computer-readable medium, and an apparatus are provided. The apparatus may be configured to determine a PSD based on a transmission power associated with transmission of an uplink signal. The apparatus may be configured to select one of a first beam or a second beam for the transmission of the uplink signal based on the PSD. The second beam may be wider than the first beam, and may be generated by a single antenna element of the apparatus. The apparatus may be configured to transmit the uplink signal using the selected one of the first beam or the second beam.

19 Claims, 7 Drawing Sheets

(51) Int. Cl.
*H04W 52/24* (2009.01)
*H04W 72/044* (2023.01)
*H04L 1/00* (2006.01)
*H04L 5/00* (2006.01)
*H04W 52/52* (2009.01)
*H04B 17/318* (2015.01)

(52) U.S. Cl.
CPC ......... *H04L 5/0092* (2013.01); *H04W 52/241* (2013.01); *H04W 52/42* (2013.01); *H04W 52/52* (2013.01); *H04W 72/046* (2013.01); *H04W 72/0473* (2013.01)

(58) Field of Classification Search
CPC .. H04W 52/52; H04W 52/225; H04L 1/0004; H04L 5/0092; H04B 17/318; H04B 7/088; H04B 7/0695
See application file for complete search history.

(56) References Cited

U.S. PATENT DOCUMENTS

| | | | |
|---|---|---|---|
| 2011/0286372 A1* | 11/2011 | Taghavi Nasrabadi | H04B 7/082 370/310 |
| 2017/0135070 A1* | 5/2017 | Huber | H04W 72/048 |
| 2017/0295046 A1* | 10/2017 | Ahn | H04W 52/146 |
| 2017/0331670 A1* | 11/2017 | Parkvall | H04J 11/0079 |
| 2018/0041262 A1* | 2/2018 | Kang | H04B 7/063 |
| 2018/0102825 A1* | 4/2018 | Kang | H04B 7/088 |
| 2019/0074882 A1* | 3/2019 | Zhou | H04W 72/0406 |
| 2019/0132828 A1* | 5/2019 | Kundargi | H04B 7/088 |
| 2019/0174423 A1* | 6/2019 | Zhang | H04W 52/241 |
| 2019/0349868 A1* | 11/2019 | Zhang | H04L 5/0048 |
| 2019/0356439 A1* | 11/2019 | Lee | H04B 7/0408 |
| 2020/0059874 A1* | 2/2020 | Noh | H04L 5/0007 |
| 2021/0119327 A1* | 4/2021 | Fang | H04B 1/3822 |
| 2021/0385827 A1* | 12/2021 | Liang | H04L 5/0037 |

* cited by examiner

SYSTEM AND METHOD FOR CONTROLLING BEAM TYPE IN SIGNAL TRANSMISSION

CROSS REFERENCE TO RELATED APPLICATION(S)

This application claims the benefit of U.S. Provisional Application Ser. No. 62/859,620, entitled "SYSTEM AND METHOD FOR CONTROLLING BEAM TYPE IN SIGNAL TRANSMISSION" and filed on Jun. 10, 2019, which is expressly incorporated by reference herein in its entirety.

BACKGROUND

Technical Field

The present disclosure relates generally to communication systems, and more particularly, to a user equipment configured with a plurality of antenna elements.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In communicating in a radio access network (RAN), a user equipment (UE) may transmit signals using a beam. For example, the UE may generate a beam on which uplink signals are transmitted to a base station. The UE may be configured with a plurality of antenna elements with which to generate the beam.

In millimeter wave (mmW) communication, the UE may generate a directional beam. To do so, the UE may apply beamforming by combining a plurality of antenna elements (e.g., elements of an antenna array) in order to steer the directional beam toward an intended target, such as a base station. Thus, a directional beam may radiate in an intended direction.

As an alternative to a directional beam, the UE may generate a wide beam. The UE may use the wide beam for communication in various spectrums (e.g., sub-6 gigahertz communication), including spectrums associated with 5G New Radio (NR) RANs. The UE may generate a wide beam using a single antenna element. While the directional beam may radiate in an intended direction with a relatively narrower angle, the wide beam may radiate in a sector having an angle that is greater than that angle of the directional beam (e.g., the wide beam may have an angle of 120 degrees).

In mmW RANs, beamforming may bridge a link budget for both uplink and downlink communication. That is, signal transmission using directional beams may reduce the margin of the link budget, such as by reducing the effect of fading relative to signal transmission using a wide beam. However, beamforming may be detrimental to the error vector magnitude (EVM) in regions having a power spectrum density (PSD) that is relatively low, such as when the UE is relatively proximate to the base station. In relatively low PSD regions, a transmitted signal may be obscured by the noise floor when the signal is applied to a directional beam (generated by a plurality of antenna elements), as the noise fed into each antenna element is coherent. Accordingly, a need exists to prevent degradation of the EVM in relatively low PSD regions.

In an aspect of the disclosure, a method, a computer-readable medium, and an apparatus are provided. The apparatus may be configured to determine a PSD based on a transmission power associated with transmission of an uplink signal. The apparatus may be configured to select one of a first beam or a second beam for the transmission of the uplink signal based on the PSD, and the second beam may be wider than the first beam. The apparatus may be configured to transmit the uplink signal using the selected one of the first beam or the second beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
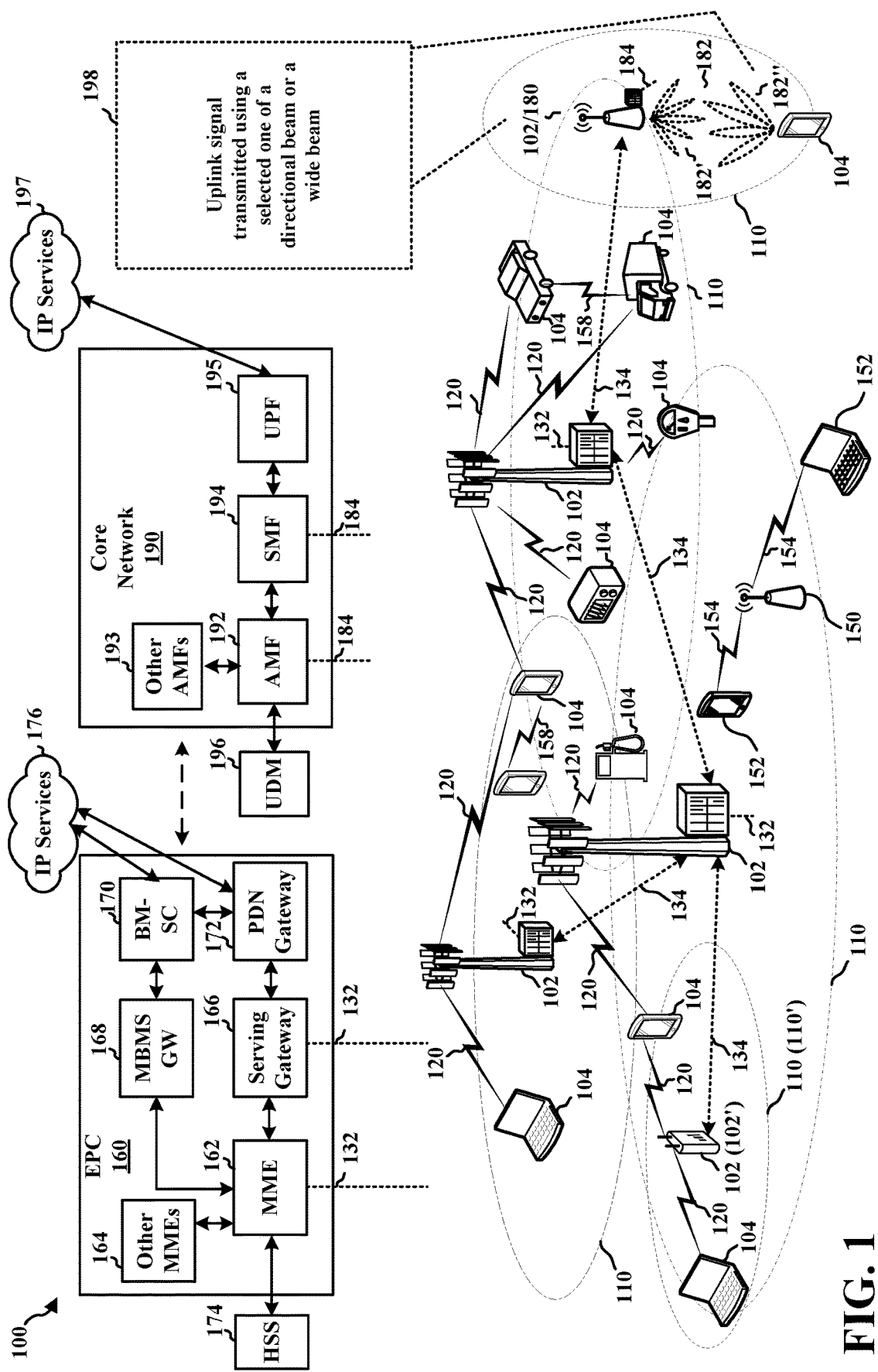
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Referring again to FIG. 1, in certain aspects, the UE 104 may be configured to determine a power spectrum density (PSD) based on a transmission power calculated for an uplink signal. Based on the PSD, the UE 104 may be configured to select one of a directional beam or a wide beam for the transmission of the uplink signal. For example, the UE 104 may compare the PSD to one or more thresholds. According to various aspects, the UE 104 may generate the directional beam using a plurality of antenna elements of the UE 104, and the UE 104 may generate the wide beam using a single antenna element of the UE 104.

When the UE 104 determines that the PSD is sufficiently low (e.g., fails to meet or exceed a first threshold), then the UE 104 may determine that the UE 104 is sufficiently proximate to the base station 102/180 for beamforming to unsatisfactorily degrade an error vector magnitude (EVM). Therefore, the UE 104 may control signal transmission to use a wide beam that is generated using a single antenna element of the UE 104, instead of using a directional beam that is generated using a plurality of antenna elements of the UE 104.

However, when the UE 104 determines that the PSD is sufficiently high (e.g., meets or exceeds a second threshold that is relatively greater than the first threshold), then the UE 104 may determine that the UE 104 is sufficiently distant from the base station 102/180 for beamforming to improve the EVM, e.g., relative to wide-beam signal transmission. In such a scenario, the UE 104 may determine to use either the wide beam or the directional beam, e.g., based on beam management by the UE 104 and/or the calculated transmission power.

Thus, the UE 104 may select one of a wide beam or a directional beam based on the PSD. The UE 104 may then transmit, to the base station 102/180, one or more uplink signals using the selected one of the directional beam or the wide beam (198).

Figure 2:
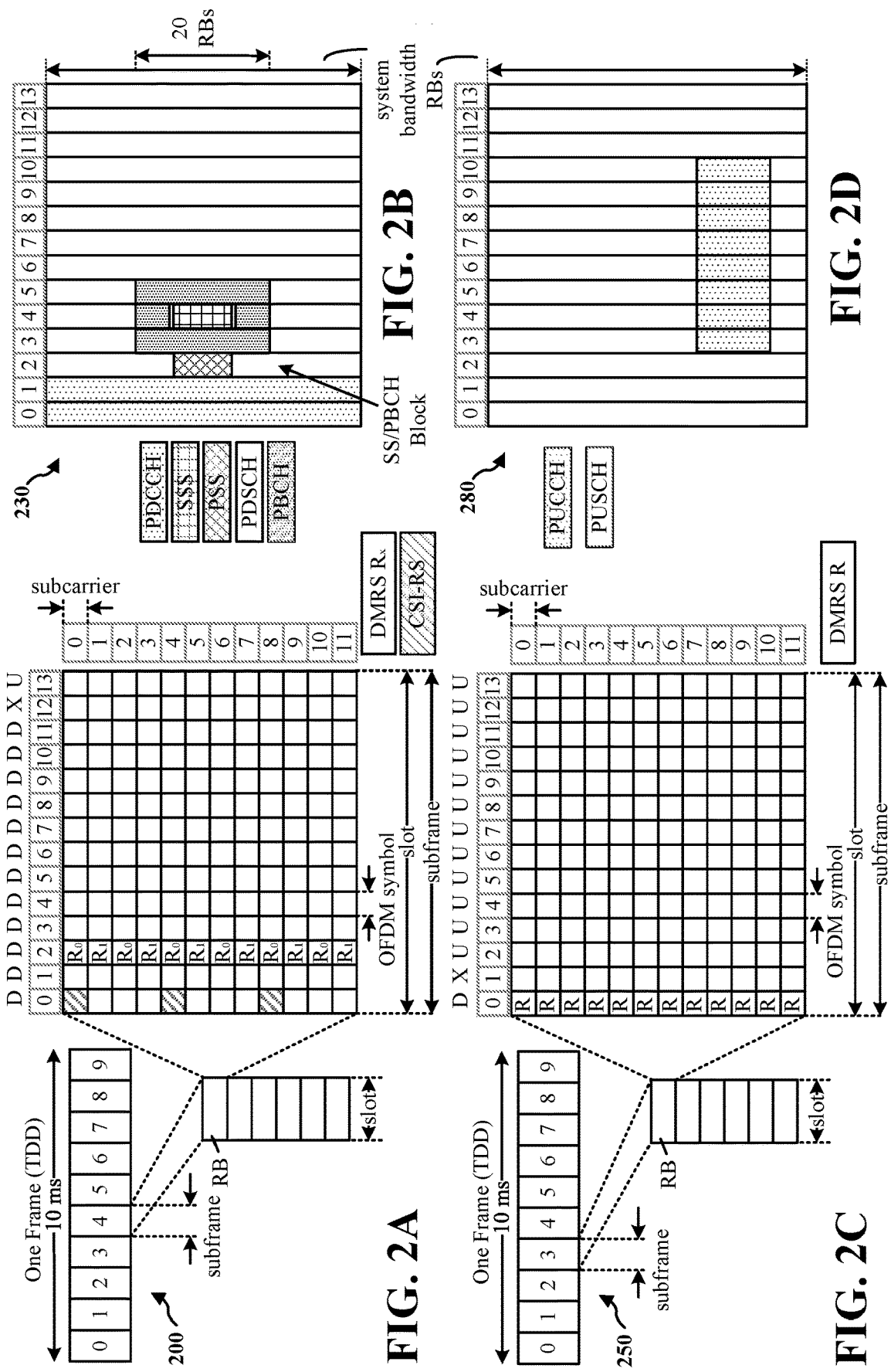
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
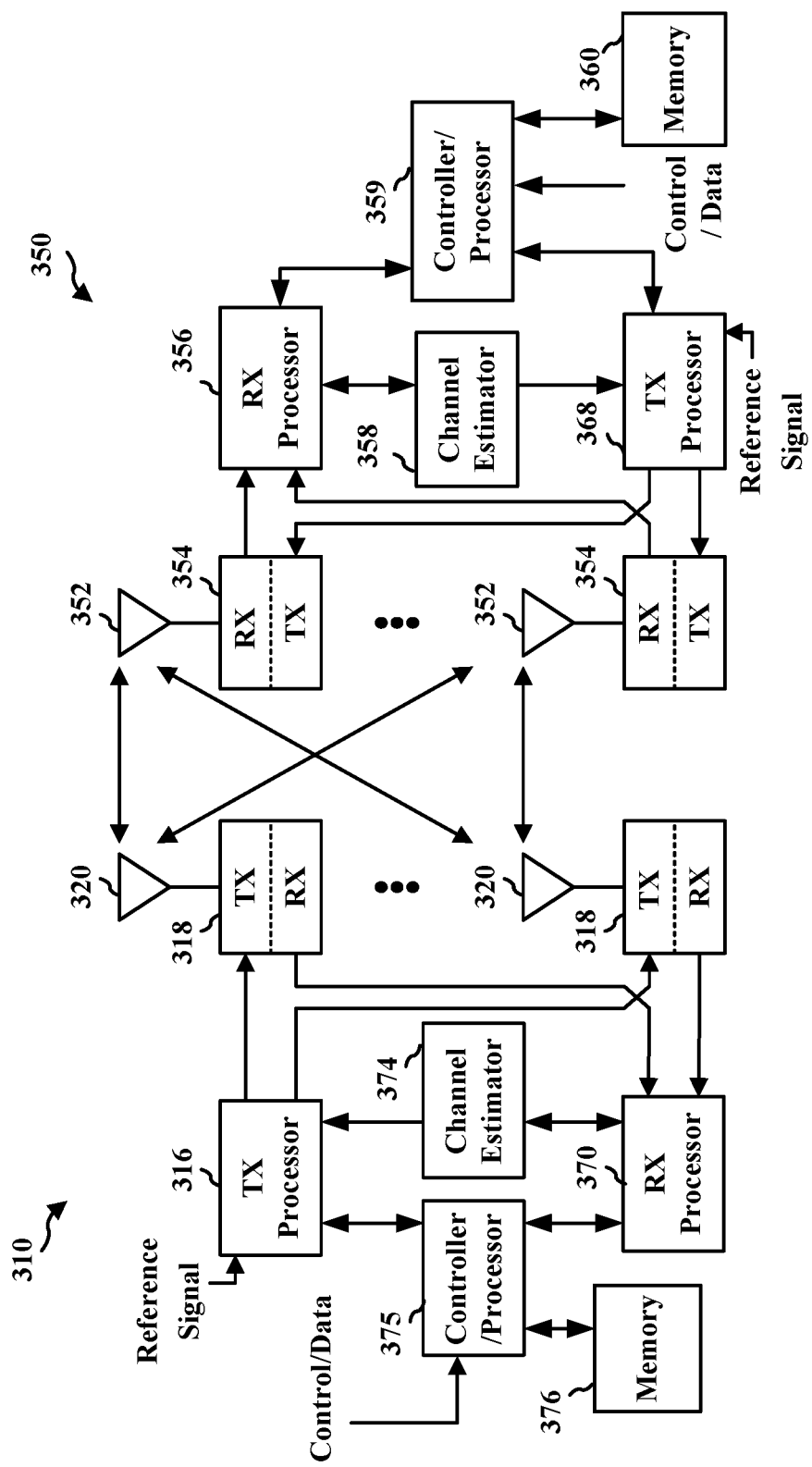
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with transmitting an uplink signal using one of a wide beam or a directional beam that is selected based on a PSD (198), as described in FIG. 1.

Referring to FIGS. 4-7, techniques and approaches to generate a satisfactory EVM when a UE is relatively proximate to a base station are described. The EVM is equal to the square root of the ratio of the mean error vector power to the mean reference power, expressed as a percent. The EVM is defined as a measure of the different between the ideal symbols of a signal and the measured symbols of the signal after equalization, the difference being the error vector. Thus, the EVM indicates the quality of a modulated signal, which results from mapping symbols according to a modulation scheme such as BPSK, QPSK, M-PSK, M-quadrature M-QAM, and so forth (e.g., as described with respect to FIG. 3). As the EVM may indicate changes to constellation points to which symbols of the signal are mapped, the EVM may also be known as the relative constellation error (RCE).

Limits for the EVM may be defined according to various standards for wireless technologies, such as 5G NR and LTE. The limits may vary according to the modulation scheme used to modulate the signal. For example, the minimum EVM for a channel in 5G NR may be 17.5% for QPSK, 12.5% for 16QAM, 8% for 64QAM. However, different EVM requirements may vary according to the channel, the transmitter (e.g., UE, base station, etc.), and other parameters.

In mmW systems, such as 5G NR, link budgets may be defined for uplink and downlink communication. Beamforming may allow a link budget to be bridged, while also meeting EVM requirements. However, when a UE is relatively proximate to a base station, beamforming may actually degrade the EVM. In particular, a signal transmitted using beamforming may become buried in the noise floor when the signal is fed into a plurality of antenna elements that generate the directional beam for beamforming. Because the noise fed into each antenna element is coherent, the EVM may become degraded when the UE is close to the base station.

A wide beam may be used for signal transmission, instead of a directional beam, to prevent the degradation of the EVM. Because the wide beam may be generated using a single antenna element, the coherence of noise, and the signal below the noise floor, fed into a plurality of antenna elements when using a directional beam may be avoided.

The present disclosure may describe various techniques and approaches for selecting either a wide beam or a directional beam for transmission of a signal in order to meet both the link budget and the EVM requirements of a wireless communications system. The selection of the wide beam or the directional beam may be based on a PSD, which may indicate the distance between the transmitter (e.g., a UE) and the receiver (e.g., a base station). For example, a PSD that is relatively low may indicate that the transmitter is relatively proximate to the receiver and, therefore, signals should be transmitted using a wide beam, which may prevent EVM degradation while also meeting the link budget. Conversely, a directional beam may be used for signal transmission that meets both link budget and EVM requirements when the PSD that is relatively higher, indicating a greater distance between the transmitter and the receiver.

Figure 4:
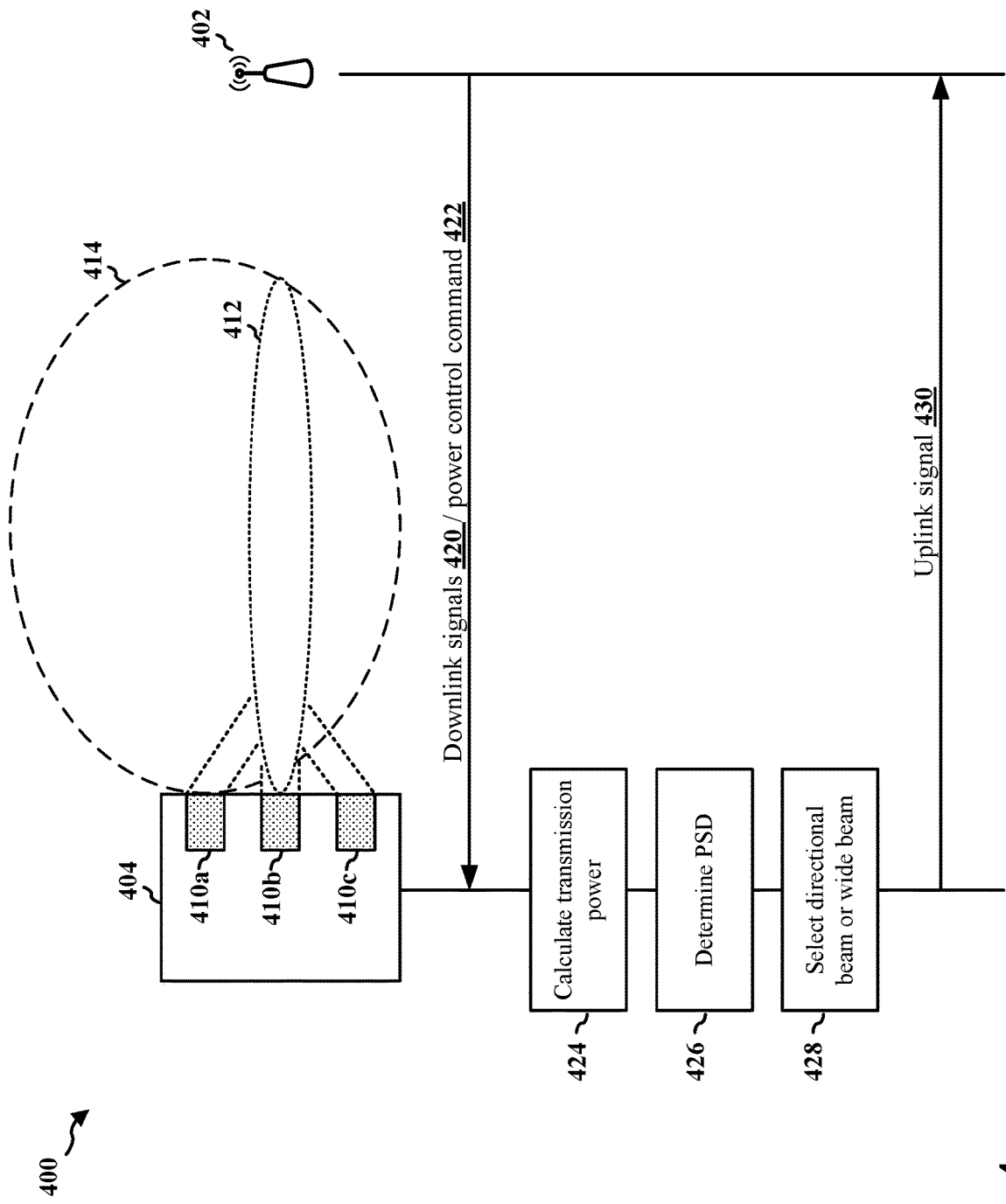
FIG. 4 is a diagram of signal transmission by a UE to a base station in a wireless communications system.

Referring to FIG. 4, a call flow diagram 400 illustrates a UE 404 in communication with a base station 402. The UE 404 may include a plurality of antenna elements 410a-c (although more or fewer antenna elements are possible in different aspects), which may be controlled by a radio frequency (RF) frontend of the UE 404. The UE 404 may be configured for beamforming by generating a directional beam 412 using the plurality of antenna elements 410a-c. In addition, the UE 404 may be configured to generate a wide beam 414 using a single antenna element 410a.

The wide beam 414 may be wider than the directional beam 412. According to one aspect, the wide beam 414 may cover one sector of a plurality of sectors corresponding to different directions around the UE 404. For example, the UE 404 may generate the wide beam 414 using the single antenna element 410a to cover one transmission sector of 120° around the UE 404, and the UE 404 may be configured to generate two similar wide beams using other single antenna elements of the UE 404 to cover each of the remaining two sectors of 120°. In another aspect, the wide beam 414 may be an omnidirectional beam.

The UE 404 may operate on a cell provided by the base station 402, such as by synchronizing with the base station 402 according to a random access channel (RACH) procedure. When operating on the cell, the UE 404 may receive downlink signals 420 from the base station 402. The downlink signals 420 may include SS/PBCH blocks, CSI-RS, and/or other reference signals. Based on the downlink signals 420, the UE 404 may perform one or more measurements. For example, the UE 404 may measure a reference signal received power (RSRP) and/or another value indicative of a path loss with the base station 402.

In addition, the base station 402 may transmit a power control command 422 to the UE 404. The UE 404 may receive the power control command 422, and may use the power control command 422 in order to calculate 424 an uplink transmission power. For example, the power control command 422 may indicate an index 1 of a power control adjustment state.

When the UE 404 is to transmit an uplink signal to the base station 402, the UE 404 may calculate 424 the transmission power to be applied for the signal transmission. The calculation 424 of the transmission power may include an automatic gain control (AGC) algorithm that considers a plurality of parameters, such as the measurements performed on the downlink signals 420, the power control command 422, a bandwidth part associated with the transmission of the uplink signal 430, a modulation and coding scheme (MCS) associated with the transmission of the uplink signal 430, and/or one or more other parameters.

By way of illustration, 3GPP Technical Specification 38.213 illustrates various functions (e.g., for AGC) that the UE 404 may implement in the calculation 424 of the transmission power. The UE 404 may transmit on an active uplink bandwidth part b of carrier f of a cell c using a power control adjustment state with index 1 in transmission occasion i. The base station 402 may provide the cell c, and may the UE 404 may receive information from the base station 402 indicating the active uplink bandwidth part b of carrier f. Further, for the cell c, the UE 404 may receive information from the base station 402 indicating an index j of a parameter set configuration for the cell c and an index 1 of a power control adjustment state.

When the UE 404 is to transmit the uplink signal 430 on the PUSCH, for example, the UE 404 may calculate 424 the transmission power for the uplink signal 430 to be transmitted on the PUSCH as $P_{PUSCH,b,f,c}(i,j,q_d,l)$. In this example, $q_d$ may be a reference signal index, which may correspond to reference signals received from the base station 402 (e.g., the downlink signals 420). The PUSCH uplink transmission power $P_{PUSCH,b,f,c}(i,j,q_d,l)$ may be defined in § 7.1.1 of 3GPP TS 38.213.

When the UE 404 is to transmit the uplink signal 430 on the PUCCH, for example, the UE 404 may calculate 424 the transmission power for the uplink signal 430 to be transmitted on the PUCCH as $P_{PUCCH,b,f,c}(i,q_u,q_d,l)$. In this example, $q_d$ may be a reference signal index for an active downlink bandwidth part of carrier f of the primary cell c, which may correspond to reference signals received from the base station 402 (e.g., the downlink signals 420). Further, $q_u$ may be PUCCH power control parameter (e.g., a value associated with P0-PUCCH), which the UE 404 may receive from the base station 402. The PUCCH uplink transmission power $P_{PUCCH,b,f,c}(i,q_u,q_d,l)$ may be defined in § 7.2.1 of 3GPP TS 38.213.

When the UE 404 is to transmit the uplink signal 430 as an SRS, for example, the UE 404 may calculate 424 the transmission power for the uplink signal 430 to be transmitted as $P_{SRS,b,f,c}(i,q_s,l)$. In this example, $q_s$ may indicate an SRS resource set, which may be received by the UE 404 from the base station 402. The SRS transmission power $P_{SRS,b,f,c}(i,q_s,l)$ may be defined in § 7.3.1 of 3GPP TS 38.213.

Based on the calculation 424 of the transmission power for the transmission of the uplink signal 430, the UE 404 may determine a PSD. For example, the PSD may be associated with the bandwidth of the channel on which the uplink signal 430 is carried. The transmission power for the transmission of the uplink signal 430, however, may be calculated 424 for the entire active uplink bandwidth part, including other spectrums of the active uplink bandwidth part that do not carry the uplink signal 430. Therefore, the UE 404 may subtract out the spectrum of the active uplink bandwidth part on which the uplink signal 430 is to be carried in order to derive the PSD associated with the uplink signal 430. To do so, the UE 404 may divide the calculated transmission power by the bandwidth on which the uplink signal 430 is to be carried.

For example, the UE 404 may determine a PSD when the uplink signal 430 is to be carried on the PUSCH as $$\frac{P_{PUSCH,b,f,c}(i,j,q_d,l)}{\text{number of } RBs \text{ of } PUSCH} \text{ and/or } \frac{P_{PUSCH,b,f,c}(i,j,q_d,l)}{\text{bandwidth of } PUSCH}.$$

Similarly, the UE 404 may determine a PSD when the uplink signal 430 is to be carried on the PUCCH as $$\frac{P_{PUCCH,b,f,c}(i,q_u,q_d,l)}{\text{number of } RBs \text{ of } PUCCH} \text{ and/or } \frac{P_{PUCCH,b,f,c}(i,q_u,q_d,l)}{\text{bandwidth of } PUCCH}.$$

Further, the UE 404 may determine a PSD when the uplink signal 430 is an SRS as $$\frac{P_{SRS,b,f,c}(i,q_s,l)}{\text{number of } RBs \text{ of } SRS} \text{ and/or } \frac{P_{SRS,b,f,c}(i,q_s,l)}{\text{bandwidth of } SRS}.$$

As described, supra, the PSD may indicate the distance between the UE 404 and the base station 402. A relatively low PSD may indicate that the UE 404 is relatively proximate to the base station 402 and, therefore, signal transmission using beamforming to generate a directional beam may degrade the EVM. Conversely, a relatively high PSD may indicate that the UE 404 is relatively further from the base station 402 and, therefore, signal transmission using beamforming to generate a directional beam may be used in order to meet the link budget and EVM requirements. Accordingly, the UE 404 may select 428 one of a directional beam 412 or a wide beam 414 based on the PSD.

In order to determine whether the PSD is relatively high or relatively low, the UE 404 may compare the PSD to one or more thresholds. For example, the UE 404 may compare the determined PSD to a first threshold associated with a relatively low PSD. The UE 404 may determine whether the PSD satisfies the first threshold, such as by determining whether the PSD is greater than or equal to the first threshold.

If UE 404 determines that the PSD fails to satisfy (e.g., is less than) the first threshold, then the UE 404 may select 428 the wide beam 414 for the transmission of the uplink signal 430. For example, the UE 404 may force the RF frontend of the UE 404 to generate the wide beam 414 for signal transmission when the UE 404 determines that the PSD is less than the first threshold. The wide beam 414 may be generated by a single antenna element 410a of the UE 404. Thus, the UE 404 may transmit the uplink signal 430 to the base station 402 using the wide beam 414 generated by the single antenna element 410a of the UE 404.

Beamforming by the UE 404 using a plurality of the antenna elements 410a-c may function as a gain stage for signal transmission. Thus, signal transmission using the directional beam 412 may increase the gain of the signal transmission, whereas signal transmission using the wide beam 414 generated by a single antenna element 410a may lack such a gain stage. Accordingly, the UE 404 may increase the gain associated with transmission of the uplink signal 430 when the UE 404 selects the wide beam 414 for transmission of the uplink signal 430. For example, the UE 404 may apply a low-noise amplifier or other earlier gain stage to increase the gain associated with transmission of the uplink signal 430 using the wide beam 414, e.g., so that the transmission power is approximately equal using the wide beam 414 or the directional beam 412.

In order to determine if the PSD is relatively high, the UE 404 may compare the PSD to a second threshold, which may be associated with a relatively high PSD and may be higher than the first threshold. If UE 404 determines that the PSD satisfies (e.g., is greater than or equal to) the second threshold, then the UE 404 may refrain from forcing the RF frontend of the UE 404 to generate the wide beam 414 for signal transmission. Instead, the UE 404 may select between the directional beam 412 or the wide beam 414 for the transmission of the uplink signal 430.

In one aspect, the UE 404 may determine the type of beam to be used for signal transmission based on the calculated transmission power and/or beam management by the UE 404. Beam management may include beam sweeping by the UE 404, beam measurements by the UE 404, beam determination by the UE 404, and/or beam reporting by the UE 404. For example, the UE 404 may perform beam management to determine that a suitable directional beam for uplink transmission exists and, therefore, that suitable directional beam should be used for transmission of the uplink signal 430 when the PSD satisfies the second threshold.

Further, the UE 404 may compare the calculated transmission power to a transmission power threshold. If the UE 404 determines that the calculated transmission power satisfies the transmission power threshold, then the UE 404 may select the directional beam 412 for signal transmission. If the UE 404 determines that the calculated transmission power fails to satisfy the transmission power threshold, then the UE 404 may select the wide beam 414 for signal transmission. Thus, the UE 404 may transmit the uplink signal 430 to the base station 402 using one of the directional beam 412 or the wide beam 414, which may be selected based on the calculated transmission power and/or beam management by the UE 404.

According to some aspects, the UE 404 may set a flag in order to force the transmission of the uplink signal 430 to use the wide beam 414. For example, a baseband processor of the UE 404 may set the flag to "1" when the PSD fails to satisfy the first threshold (e.g., the PSD may fail to satisfy the first threshold when the PSD is less than the first threshold). However, the baseband processor may set the flag to "0" when the PSD satisfies the second threshold (e.g., the PSD may satisfy the second threshold when the PSD is greater than or equal to the second threshold). The baseband processor of the UE 404 may indicate the flag to the RF frontend of the UE 404. Based on the flag, the RF frontend of the UE 404 may transmit the uplink signal 430 using the wide beam 414 when the flag is set to "1" and may determine which of the directional beam 412 or the wide beam 414 is to be used when the flag is set to "0".

A range of potential PSD values may exist between the first and second thresholds. If the UE 404 determines that the PSD is between the first and second thresholds (e.g., the PSD satisfies the first threshold but does not satisfy the second threshold), then the UE 404 may determine whether to force the uplink signal 430 to be transmitted using the wide beam 414 based on transmission of a previous uplink signal. For example, when the PSD is between the first and second thresholds, the UE 404 may maintain the flag setting from the transmission of the previous uplink signal when transmitting the uplink signal 430.

In other words, if the previous uplink signal was associated with a PSD that failed to satisfy the first threshold (thereby forcing the RF frontend to transmit the previous uplink signal using the wide beam 414), then the UE 404 may continue to force the RF frontend to transmit the uplink signal 430 using the wide beam 414. However, if the previous uplink signal was associated with a PSD that satisfied the second threshold (thereby allowing selection between the directional beam 412 and the wide beam 414 based on beam management and/or a previous transmission power), then the UE 404 may refrain from forcing the RF frontend to transmit the uplink signal 430 using the wide beam 414. Instead, the UE 404 may select between the directional beam 412 and the wide beam 414 based on the transmission of the previous uplink signal.

Figure 5:
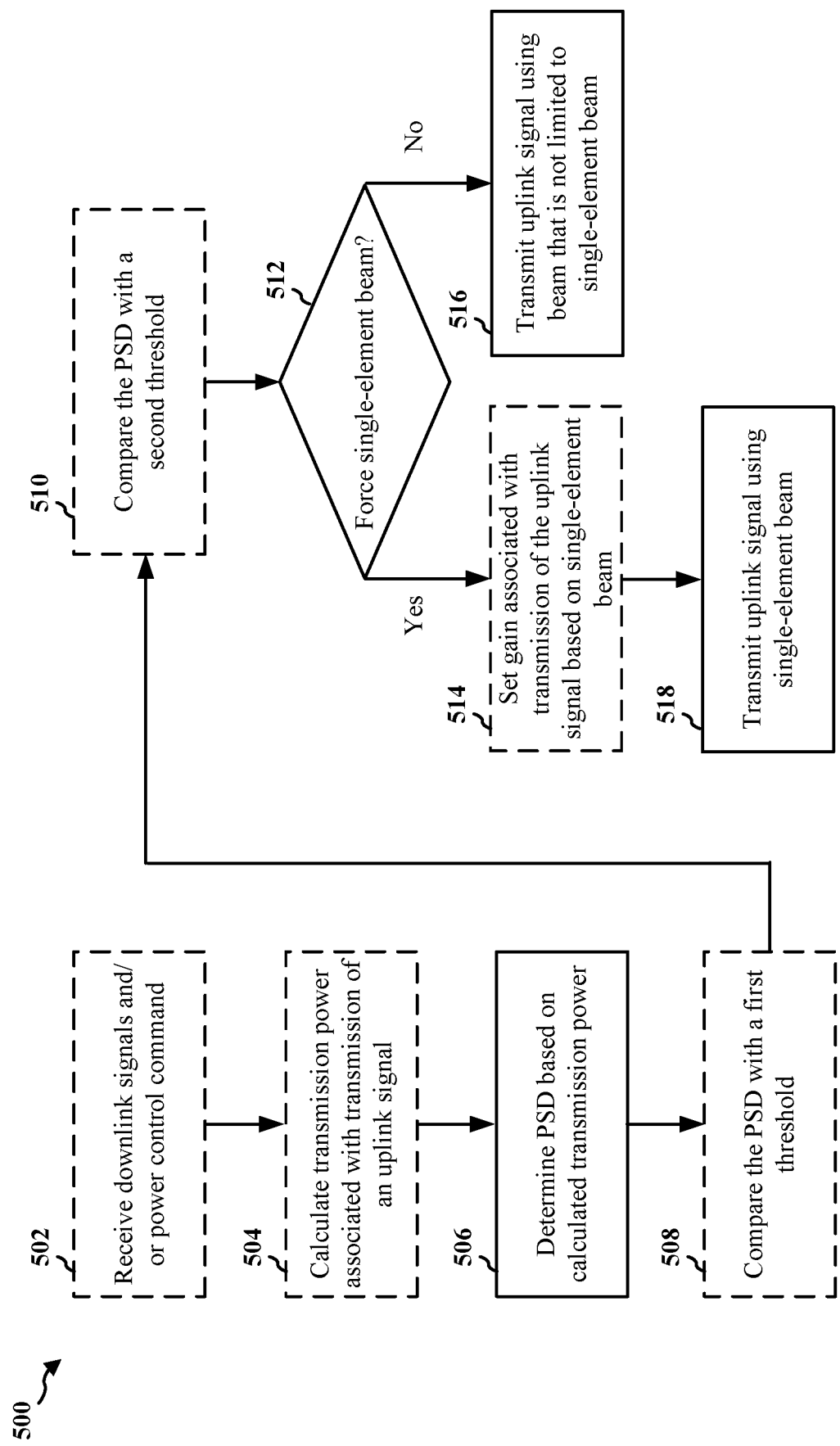
FIG. 5 is a flowchart of a method of wireless communication.

FIG. 5 is a flowchart of a method 500 of wireless communication. The method 500 may be performed by a UE (e.g., the UE 104, the UE 350, the UE 404) and/or an apparatus (e.g., the apparatus 602/602'). For example, the method 500 may be performed by the processing system 714, which may include the memory 360 and which may be the entire UE 350 or a component of the UE 350, such as the TX processor 368, the RX processor 356, and/or the controller/processor 359). According to various aspects, one or more operations of the method 500 may be transposed, omitted, and/or contemporaneously performed. In some other aspects, one or more operations of the method 500 may be optional, e.g., as indicated in FIG. 5 by dashed lines.

At operation 502, the UE may receive downlink signals and/or a power control command from a base station. The downlink signals may include reference signals, such as SS/PBCH blocks and/or CSI-RS. For example, referring to FIG. 4, the UE 404 may receive the downlink signals 420 and the power control command 422 from the base station 402.

At operation 504, the UE may calculate a transmission power associated with transmission of an uplink signal. For example, the UE may identify a set of parameters associated with AGC, and the UE may evaluate a function and/or other AGC algorithm based on the identified set of parameters received from the base station. The UE may calculate the transmission power associated with the transmission of the uplink signal based on at least one of an MCS associated with transmission of the uplink signal, a bandwidth part associated with the transmission of the uplink signal, the power control command received from the base station, and/or one or more measured associated with the downlink signals received from the base station. For example, referring to FIG. 4, the UE 404 may calculate 424 the transmission power associated with transmission of the uplink signal 430.

At operation 506, the UE may determine a PSD based on the calculated transmission power. For example, the UE may divide the calculated transmission power by the bandwidth on which the uplink signal is to be transmitted in order to obtain the PSD. For example, referring to FIG. 4, the UE 404 may determine 426 the PSD associated with transmission of the uplink signal 430.

At operation 508, the UE may compare the PSD with a first threshold. The UE may determine whether the PSD satisfies (e.g., is greater than or equal to) the first threshold. If the PSD fails to satisfy the first threshold (e.g., the PSD is less than the first threshold), then the PSD may indicate a relatively low PSD region. For example, referring to FIG. 4, the UE 404 may compare the determined PSD with the first threshold to determine whether the determined PSD satisfies the first threshold.

At operation 510, the UE may compare the PSD with a second threshold, and the second threshold may be relatively greater than the first threshold. The UE may determine whether the PSD satisfies (e.g., is greater than or equal to) the second threshold, which may indicate a relatively high PSD region. For example, referring to FIG. 4, the UE 404 may compare the determined PSD with the second threshold to determine whether the determined PSD satisfies the second threshold.

At operation 512, the UE may determine whether to force signal transmission using a single-element beam. The single-element beam may be a wide beam having an angle greater than a multi-element beam, which may be a directional beam. For example, the UE may generate the single-element beam as a wide beam that is relatively wider than a multi-element beam that the UE may generate as a directional beam (e.g., using beamforming). For example, the UE may select one of a directional beam or a wide beam based on the PSD.

According to one aspect, the UE may select the single-element beam when the PSD does not satisfy the first threshold (e.g., the PSD may fail to satisfy the first threshold when the PSD is less than the first threshold). In one aspect, if the PSD is between the first and second threshold, and therefore satisfies the first threshold and not the second threshold, the UE may select between a multi-element beam or single-element beam based on transmission of a previous uplink signal. For example, the UE may force signal transmission using the single-element beam if the UE forced transmission of the previous uplink signal using the single-element beam. However, the UE may select between the multi-element beam and the single-element beam if the UE did not force transmission of the previous uplink signal using the single-element beam. For example, referring to FIG. 4, the UE 404 may select 428 one of the directional beam 412 or the wide beam 414 for transmission of the uplink signal 430 based on the determined PSD.

If the UE selects the single-element beam, the UE may set a gain associated with transmission of the uplink signal based on the single-element beam, as shown at operation 514. For example, the UE may amplify the signal and/or apply another earlier gain stage to the signal transmission before the uplink signal is transmitted at the single antenna element that generates the single-element beam. For example, referring to FIG. 4, the UE 404 may increase a gain associated with transmission of the uplink signal 430 when the uplink signal 430 is to be transmitted using the wide beam 414.

At operation 518, the UE may transmit the uplink signal using the single-element beam. The UE may generate the single-element beam as a wide beam using a single antenna element of the UE. In one aspect, a baseband processor of the UE may force an RF frontend of the UE to use the single-element beam for transmission of the uplink signal. For example, referring to FIG. 4, the UE 404 may transmit the uplink signal 430 using the wide beam 414, which may be generated by a single antenna element 410a of the UE 404.

If the UE does not force uplink signal transmission using the single-element beam, the UE may transmit the uplink signal using the single-element beam or the multi-element beam, as shown at operation 516. For example, if the PSD satisfies the second threshold (e.g., as well as satisfying the first threshold), the UE may select between the multi-element beam or the single-element beam based on the calculated transmission power and/or beam management by the UE. The UE may generate the multi-element beam using a plurality of antenna elements of the UE. For example, referring to FIG. 4, the UE 404 may transmit the uplink signal 430 using the directional beam 412, which may be generated by the plurality of antenna elements 410a-c of the UE 404.

Figure 6:
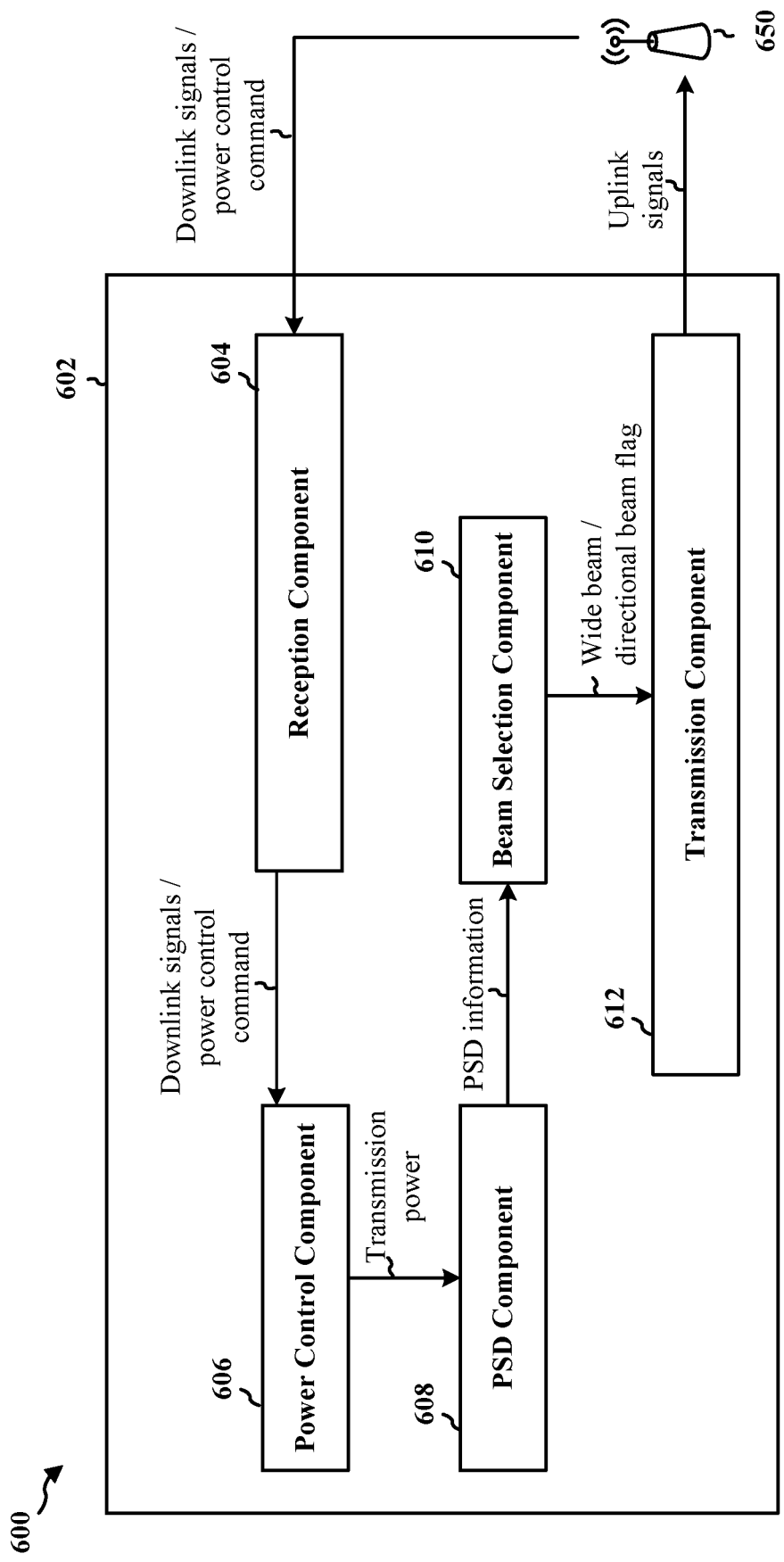
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus 602 may be a UE. The apparatus 602 includes a reception component 604 that receives downlink signals and/or power control commands from a base station 650, e.g., as described in connection with operation 502 of FIG. 5.

The apparatus 602 may include a power control component 606 that calculates a transmission power based on at least one of an MCS associated with transmission of an uplink signal, a bandwidth part associated with transmission of the uplink signal, a power control command received from the base station 650, and/or one or more measurements associated with the downlink signals received from the base station 650, e.g., as described in connection with operation 504 of FIG. 5.

The apparatus 602 may include a PSD component 608 that may determine a PSD based on the calculated transmission power associated with transmission of the uplink signal, e.g., as described in connection with operation 506 of FIG. 5. For example, the PSD component 608 may compare the PSD with a first threshold, and the PSD component 608 may determine whether the PSD is less than the first threshold, e.g., as described in connection with operation 508 of FIG. 5. If the PSD component 608 determines that the PSD is less than the first threshold, then the PSD component 608 may set a flag to a value indicating signal transmission is to be forced using a signal antenna element (e.g., wide-beam signal transmission). Further, the PSD component 608 may compare the PSD with a second threshold, and the PSD component 608 may determine whether the PSD is greater than the second threshold, e.g., as described in connection with operation 510 of FIG. 5. If the PSD component 608 determines that the PSD is greater than the second threshold, then the PSD component 608 may set a flag to a value indicating signal transmission is to use either a signal antenna element (e.g., wide-beam signal transmission) or a plurality of antenna elements (e.g., directional-beam signal transmission) based on beam management and/or the calculated transmission power. If the PSD component 608 determines that the PSD is greater than the first threshold but less than the second threshold, then the PSD component 608 may keep a flag set to the value from a previous uplink signal transmission.

The apparatus 602 may include a beam selection component 610 that may select one of a directional beam or a wide beam based on an indication from the PSD component 608, e.g., as described in connection with operation 512 of FIG.

5. The apparatus 602 may include a transmission component 612 that may transmit the uplink signal using the selected one of the directional beam or the wide beam, e.g., as described in connection with operations 516 and 518 of FIG. 5. If the uplink signal is transmitted using the wide beam, the transmission component 612 may increase a gain associated with the transmission of the uplink signal, e.g., as described in connection with operation 514 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
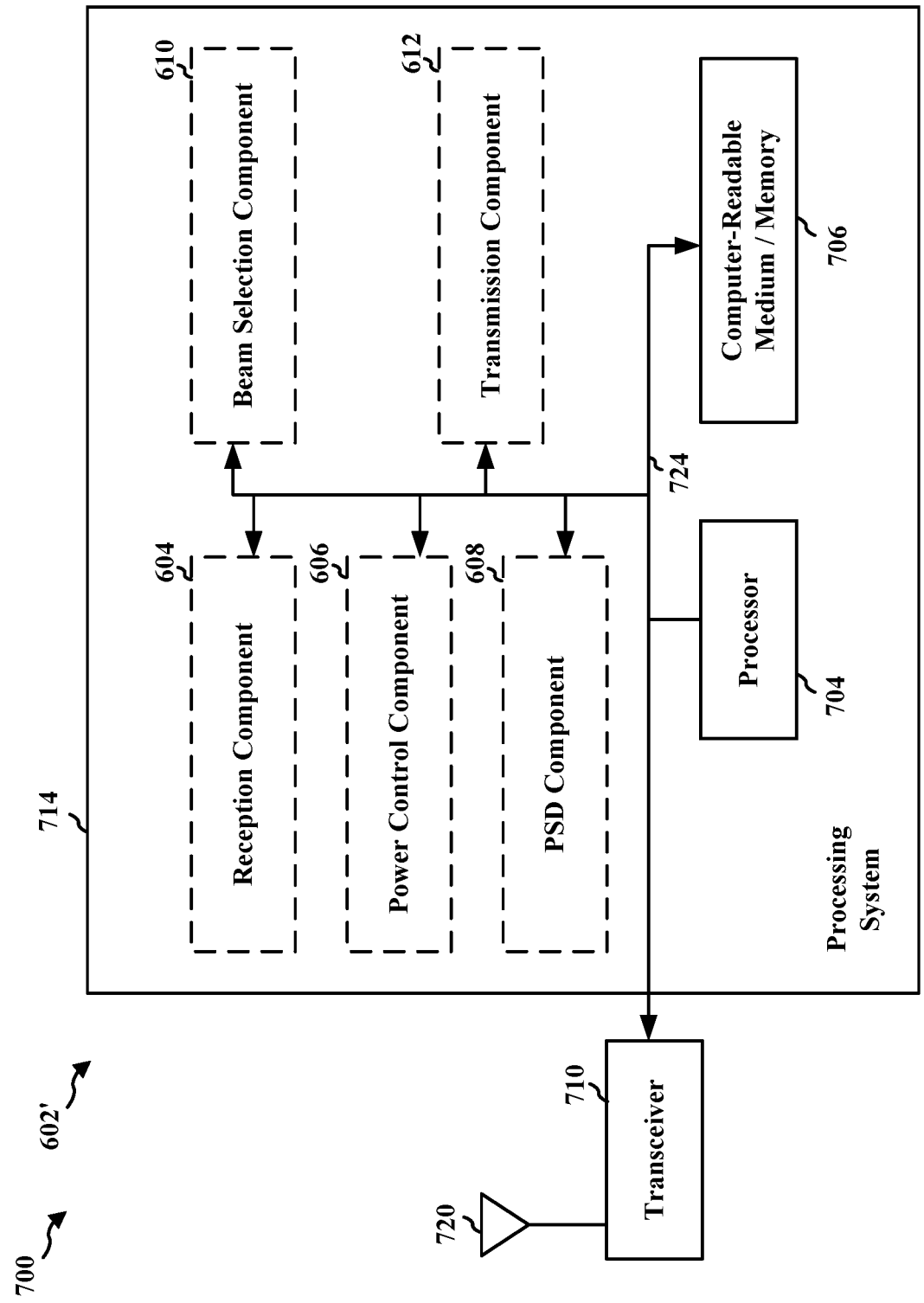
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 612, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for determining a PSD based on a transmission power associated with transmission of an uplink signal; means for selecting one of a first beam or a second beam for the transmission of the uplink signal based on the PSD, and the second beam may be wider than the first beam; and means for transmitting the uplink signal using the selected one of the first beam or the second beam. In one aspect, the first beam is generated by a plurality of antenna elements of the apparatus 602/602', and the second beam is generated by a single antenna element of the apparatus 602/602'.

In one aspect, the means for selecting one of the first beam or the second beam for the transmission of the uplink signal based on the PSD is configured to: compare the PSD with a first threshold; select the second beam for the transmission of the uplink signal when the PSD is less than the first threshold; compare the PSD with a second threshold that is relatively greater than the first threshold; and select the first beam or the second beam for the transmission of the uplink signal based on a transmission power UE for the uplink signal when the PSD is greater than the second threshold. In one aspect, when the PSD is between the first threshold and the second threshold, the selecting one of the first beam or the second beam is based on which of the first beam or the second beam is used for transmission of a previous uplink signal.

The apparatus 602/602' may further include means for increasing gain associated with the transmission of the uplink signal when the second beam is selected for the transmission of the uplink signal. The apparatus 602/602' may further includes means for calculating the transmission power associated with the transmission of the uplink signal based on at least one of an MCS associated with the transmission of the uplink signal, a bandwidth part associated with the transmission of the uplink signal, a power control command received from a base station, or one or more measurements associated with downlink signals received from the base station, and the PSD is determined based on the calculated transmission power divided by a bandwidth of the uplink signal.

The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As described herein, example 1 may be a UE that is configured to determine a PSD based on a transmission power associated with transmission of an uplink signal; select one of a first beam or a second beam for the transmission of the uplink signal based on the PSD, wherein the second beam is wider than the first beam; and transmit the uplink signal using the selected one of the first beam or the second beam. Example 2 may be the UE of example 1, and the first beam is generated by a plurality of antenna elements of the UE, and the second beam is generated by a single antenna element of the UE. Example 3 may be the UE of any of examples 1 through 2, and the selection of one of the first beam or the second beam for the transmission of the uplink signal based on the PSD comprises to: compare the PSD with a first threshold; select the second beam for the transmission of the uplink signal when the PSD is less than the first threshold; compare the PSD with a second threshold that is relatively greater than the first threshold; and select the first beam or the second beam for the transmission of the uplink signal based on a transmission power associated with the uplink signal when the PSD is greater than the second threshold. Example 4 may be the UE of example 3, and, when the PSD is between the first threshold and the second threshold, the selection of one of the first beam or the second beam is based on which of the first beam or the second beam is used for transmission of a previous uplink signal. Example 5 may be the UE of any of examples 1 through 4, and the UE may be further configured to increase gain associated with the transmission of the uplink signal when the second beam is selected for the transmission of the uplink signal. Example 6 may be the UE of any of examples 1 through 5, and the UE may be further configured to calculate the transmission power associated with the transmission of the uplink signal based on at least one of a MCS associated with the transmission of the uplink signal, a bandwidth part associated with the transmission of the uplink signal, a power control command received from a base station, or one or more measurements associated with downlink signals received from the base station, and the PSD is determined based on the calculated transmission power divided by a bandwidth of the uplink signal.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   selecting one of a first beam or a second beam that is wider than the first beam for transmission of an uplink signal when a power spectrum density (PSD) satisfies at least one threshold or the second beam when the PSD fails to satisfy the at least one threshold, the PSD being based on a transmission power associated with the transmission of the uplink signal; and
   transmitting the uplink signal using the selected one of the first beam or the second beam.

2. The method of claim 1, wherein the first beam is generated by a plurality of antenna elements of the UE, and wherein the second beam is generated by a single antenna element of the UE.

3. The method of claim 1, wherein the selecting one of the first beam or the second beam that is wider than the first beam for the transmission of the uplink signal when the PSD satisfies the at least one threshold or the second beam when the PSD fails to satisfy the at least one threshold comprises:
   comparing the PSD with a first threshold of the at least one threshold;
   selecting the second beam for the transmission of the uplink signal when the PSD is less than the first threshold;
   comparing the PSD with a second threshold of the at least one threshold that is relatively greater than the first threshold; and
   selecting the first beam or the second beam for the transmission of the uplink signal based on a transmission power associated with the uplink signal when the PSD is greater than the second threshold.

4. The method of claim 3, wherein, when the PSD is between the first threshold and the second threshold, the selecting one of the first beam or the second beam is based on which of the first beam or the second beam is used for transmission of a previous uplink signal.

5. The method of claim 1, further comprising:
   increasing gain associated with the transmission of the uplink signal when the second beam is selected for the transmission of the uplink signal.

6. The method of claim 1, further comprising:
   calculating the transmission power associated with the transmission of the uplink signal based on at least one of a modulation and coding scheme (MCS) associated with the transmission of the uplink signal, a bandwidth part associated with the transmission of the uplink signal, a power control command received from a base station, or one or more measurements associated with downlink signals received from the base station,
   wherein the PSD is determined based on the calculated transmission power divided by a bandwidth of the uplink signal.

7. A user equipment (UE), comprising:
   means for selecting one of a first beam or a second beam that is wider than the first beam for transmission of an uplink signal when a power spectrum density (PSD) satisfies at least one threshold or the second beam when the PSD fails to satisfy the at least one threshold, the PSD being based on a transmission power associated with the transmission of the uplink signal; and means for transmitting the uplink signal using the selected one of the first beam or the second beam.

8. The UE of claim 7, wherein the first beam is generated by a plurality of antenna elements of the UE, and wherein the second beam is generated by a single antenna element of the UE.

9. The UE of claim 7, wherein the means for selecting one of the first beam or the second beam that is wider than the first beam for the transmission of the uplink signal when the PSD satisfies the at least one threshold or the second beam when the PSD fails to satisfy the at least one threshold is configured for:

comparing the PSD with a first threshold of the at least one threshold;

selecting the second beam for the transmission of the uplink signal when the PSD is less than the first threshold;

comparing the PSD with a second threshold of the at least one threshold that is relatively greater than the first threshold; and selecting the first beam or the second beam for the transmission of the uplink signal based on a transmission power associated with the uplink signal when the PSD is greater than the second threshold.

10. The UE of claim 9, wherein, when the PSD is between the first threshold and the second threshold, the selecting one of the first beam or the second beam is based on which of the first beam or the second beam is used for transmission of a previous uplink signal.

11. The UE of claim 7, further comprising:

means for increasing gain associated with the transmission of the uplink signal when the second beam is selected for the transmission of the uplink signal.

12. The UE of claim 7, further comprising:

means for calculating the transmission power associated with the transmission of the uplink signal based on at least one of a modulation and coding scheme (MCS) associated with the transmission of the uplink signal, a bandwidth part associated with the transmission of the uplink signal, a power control command received from a base station, or one or more measurements associated with downlink signals received from the base station, wherein the PSD is determined based on the calculated transmission power divided by a bandwidth of the uplink signal.

13. A user equipment (UE), comprising:

a memory; and at least one processor coupled to the memory and configured to:

select one of a first beam or a second beam that is wider than the first beam for transmission of an uplink signal when a power spectrum density (PSD) satisfies at least one threshold or the second beam when the PSD fails to satisfy the at least one threshold, the PSD being based on a transmission power associated with the transmission of the uplink signal; and transmit the uplink signal using the selected one of the first beam or the second beam.

14. The UE of claim 13, wherein the first beam is generated by a plurality of antenna elements of the UE, and wherein the second beam is generated by a single antenna element of the UE.

15. The UE of claim 13, wherein the selection of one of the first beam or the second beam that is wider than the first beam for the transmission of the uplink signal when the PSD satisfies the at least one threshold or the second beam when the PSD fails to satisfy the at least one threshold comprises to:

compare the PSD with a first threshold of the at least one threshold;

select the second beam for the transmission of the uplink signal when the PSD is less than the first threshold;

compare the PSD with a second threshold of the at least one threshold that is relatively greater than the first threshold; and select the first beam or the second beam for the transmission of the uplink signal based on a transmission power associated with the uplink signal when the PSD is greater than the second threshold.

16. The UE of claim 15, wherein, when the PSD is between the first threshold and the second threshold, the selection of one of the first beam or the second beam is based on which of the first beam or the second beam is used for transmission of a previous uplink signal.

17. The UE of claim 13, wherein the at least one processor is further configured to:

increase gain associated with the transmission of the uplink signal when the second beam is selected for the transmission of the uplink signal.

18. The UE of claim 13, wherein the at least one processor is further configured to:

calculate the transmission power associated with the transmission of the uplink signal based on at least one of a modulation and coding scheme (MCS) associated with the transmission of the uplink signal, a bandwidth part associated with the transmission of the uplink signal, a power control command received from a base station, or one or more measurements associated with downlink signals received from the base station, wherein the PSD is determined based on the calculated transmission power divided by a bandwidth of the uplink signal.

19. A non-transitory, computer-readable medium storing computer-executable code for wireless communication by a user equipment (UE), comprising code to:

select one of a first beam or a second beam that is wider than the first beam for transmission of an uplink signal when a power spectrum density (PSD) satisfies at least one threshold or the second beam when the PSD fails to satisfy the at least one threshold, the PSD being based on a transmission power associated with the transmission of the uplink signal; and transmit the uplink signal using the selected one of the first beam or the second beam.

* * * * *